(12) United States Patent
Chee et al.

(10) Patent No.: US 12,100,120 B2
(45) Date of Patent: Sep. 24, 2024

(54) MULTI-FRAME IMAGE SUPER RESOLUTION SYSTEM

(71) Applicant: Black Sesame Technologies Inc., San Jose, CA (US)

(72) Inventors: Evelyn Chee, Singapore (SG); Shanlan Shen, Singapore (SG); Jieer Ouyang, Singapore (SG); Yubo Duan, Singapore (SG)

(73) Assignee: Black Sesame Technologies Inc., San Jose, CA (US)

( * ) Notice: Subject to any disclaimer, the term of this patent is extended or adjusted under 35 U.S.C. 154(b) by 174 days.

(21) Appl. No.: 17/382,047

(22) Filed: Jul. 21, 2021

(65) Prior Publication Data

US 2023/0021463 A1 Jan. 26, 2023

(51) Int. Cl.
*G06T 3/4053* (2024.01)
*G06N 20/00* (2019.01)
*G06T 5/00* (2006.01)
*G06T 7/33* (2017.01)

(52) U.S. Cl.
CPC .......... *G06T 3/4053* (2013.01); *G06N 20/00* (2019.01); *G06T 5/00* (2013.01); *G06T 7/337* (2017.01); *G06T 2207/20221* (2013.01)

(58) Field of Classification Search
CPC ....... G06T 3/4053; G06T 5/001; G06T 7/337; G06T 2207/20221; G06T 3/40; G06T 3/4046; G06T 3/4076; G06T 5/002; G06T 5/003; G06N 20/00
See application file for complete search history.

(56) References Cited

U.S. PATENT DOCUMENTS 8,520,736 B2 8/2013 Topiwala
10,701,394 B1 * 6/2020 Caballero .............. G06N 3/045
2010/0272184 A1 10/2010 Fishbain et al.
(Continued)

FOREIGN PATENT DOCUMENTS

CN 109978775 A * 7/2019
CN 114266696 A * 4/2022
(Continued)

OTHER PUBLICATIONS

Ahn et al., "Fast, Accurate, and, Lightweight Super-Resolution with Cascading Residual Network," Computer Vision and Pattern Recognition, Submitted on Mar. 23, 2018, Last revised on Oct. 4, 2018, arXiv:1803.08664, 17 pages.
(Continued)

*Primary Examiner* — Ian L Lemieux
*Assistant Examiner* — Woo C Rhim
(74) *Attorney, Agent, or Firm* — Fish & Richardson P.C.

(57) ABSTRACT

The present invention discloses a multi-frame image super resolution system that utilizes both deep learning models and traditional models of enhancing the resolution of an image so that minimal computational resources are used. A frame alignment module of the invention aligns the frames
(Continued)

of the image after which a processing module configured within the system process the Y and the UV channels of the image by using multiple deep and traditional resolution enhancement models. A merging unit merges the output of the processors to produce a super resolution image incorporating the advantages of both of the image enhancement methods.

20 Claims, 6 Drawing Sheets

(56) References Cited

U.S. PATENT DOCUMENTS

| | | | | |
|---|---|---|---|---|
| 2015/0093015 | A1* | 4/2015 | Liang | G06F 18/24 382/154 |
| 2015/0363922 | A1 | 12/2015 | Elliott et al. | |
| 2020/0327702 | A1* | 10/2020 | Wang | H04N 19/132 |
| 2020/0402205 | A1* | 12/2020 | Su | G06T 3/4046 |
| 2021/0118095 | A1* | 4/2021 | Kim | G06T 3/4046 |
| 2021/0233210 | A1* | 7/2021 | Elron | G06T 3/4076 |
| 2022/0207680 | A1* | 6/2022 | Wang | G06N 3/045 |
| 2023/0052483 | A1* | 2/2023 | Cai | G06N 3/048 |

FOREIGN PATENT DOCUMENTS

| | | | | |
|---|---|---|---|---|
| CN | 111429371 | B * | 9/2023 | ............ G06T 5/002 |
| EP | 3493149 | | 6/2019 | |
| WO | WO-2022261849 | A1 * | 12/2022 | |

OTHER PUBLICATIONS

Dong et al., "Accelerating the Super-Resolution Convolutional Neural Network," Computer Vision and Pattern Recognition, Submitted on Aug. 1, 2016, arXiv:1608.00367, 17 pages.

Gao et al., "Image Super-Resolution Using Knowledge Distillation," Asian Conference on Computer Vision 2018, Jun. 2, 2019, 11362:527-541.

He et al., "Fakd: Feature-Affinity Based Knowledge Distillation for Efficient Image Super-Resolution," Presented at 2020 IEEE International Conference on Image Processing (ICIP), Oct. 25-28, 2020, Abu Dhabi, United Arab Emirates, p. 518-522.

Lee et al., "Learning with Privileged Information for Efficient Image Super-Resolution," European Conference on Computer Vision, 2020, 17 pages.

Li et al., "Deep learning methods in real-time image super-resolution: a survey," Journal of Real-Time Image Processing, Nov. 16, 2019, 17:1885-1909.

Wronski et al., "Handheld multi-frame super-resolution," ACM Transactions on Graphics, Jul. 12, 2019, 38(4):1-18.

* cited by examiner

MULTI-FRAME IMAGE SUPER RESOLUTION SYSTEM

FIELD OF INVENTION

The present invention relates to a system for enhancing the resolution of an image. More specifically, the present invention relates to an image resolution enhancement system that integrates deep learning models and traditional models of enhancing the resolution of an image.

BACKGROUND

Recent advancements in deep learning have enabled models to achieve good performances on image super-resolution. However, due to their heavy computation cost and high memory storage, it cannot be easily deployed on resource-constrained devices such as smartphones. Also, in real-life application, de-noising and de-blurring need to be done simultaneously with super-resolution. There is limited work published regarding light-weighted super-resolution model as there would be a drop in performance as the model size decreases.

A US patent application 20150363922A1 assigned to Samsung Electronics Co Ltd. relates to an apparatus and a method for providing a super resolution image. The method includes capturing a plurality of frames of an image, determining a reference frame from among the plurality of frames, iteratively determining an offset of each of the plurality of frames to the reference frame until unity scaling is reached, and determining a pixel value for insertion between pixels of the reference frame. However, the application uses only traditional models of resolution enhancement and does not make use of deep learning methods in order to enhance the image resolution.

Another patent EP3493149A1 assigned to Magic Pony Technology Ltd. relates to enhancing visual data based on a subset of features extracted from the lower quality visual data. Although, the invention makes use of deep learning methods in some embodiments of the invention, it fails to incorporate the advantages of using traditional models of image enhancement along with deep learning methods. Using only deep learning methods for enhancing the resolution of an image may lead to increased computational costs and may increase the overall processing time.

A research paper titled Deep learning methods in real-time image super-resolution by Zhang further mentions the use of deep learning models for enhancing the resolution of an image. The research paper suggest ways to improve usage of deep learning methods on real-time image super-resolution by using convolution neural networks (CNN) and generative adversarial networks (GAN) to predict high-frequency details lost in low-resolution images. However, the technique described fails to incorporate the advantages provided by traditional image enhancement methods.

Thus, to overcome the advantages of the above mentioned inventions, a multi-frame image super resolution system that integrates deep learning models and traditional models of enhancing the resolution of an image is introduced. The proposed system not only reduces the overall processing time but also reduces computational costs significantly.

It is apparent now that numerous methods and systems are developed in the prior art that are adequate for various purposes. Furthermore, even though these inventions may be suitable for the specific purposes to which they address, accordingly, they would not be suitable for the purposes of the present invention as heretofore described.

SUMMARY OF THE INVENTION

The amount of visual data being communicated over data networks such as the Internet has grown dramatically over time and there is increasing consumer demand for high-resolution, high quality, high fidelity visual data content, such as images and videos at HD and Ultra HD resolution. As a result, there are substantial challenges in meeting this growing consumer demand and high performance image compression is required to enable efficient use of existing network infrastructure and capacity.

The primary objective of the present invention is to introduce a multi-frame image super resolution system that integrates deep learning models and traditional models of enhancing the resolution of an image. Recent advancements in deep learning have enabled models to achieve good performances on image super-resolution. However, due to their heavy computation cost and high memory storage, it cannot be easily deployed on resource-constrained devices such as smart phones or tablets. Here, a system is proposed which integrates traditional super-resolution approaches with light-weighted models such that minimal computational resources are used and at the same time, great results can still be achieved.

The proposed invention involves multiple steps in order to enhance the resolution of an image. The invention proposes to use multiple frames of an image instead of a single frame for super resolution due to several reasons. One of the reasons of considering multiple frames is that when frames are taken at different times and even slightly different positions, the combined information from all frames would be more as compared any of the single frame.

Thus, by fusing information from the frames into the high-resolution image, more original detail could be revealed which cannot be achieved when one frame alone is used. Another factor to consider is computation complexity. In single image super resolution, deep learning models need to generate additional fake details because of the limited amount of information. For the detail to be realistic, the model needs to have large receptive field, which leads to more complex model.

Another objective of the present invention is to introduce the technique of frame alignment performed by a frame alignment module before processing the image with deep learning and traditional models of image enhancement. The frame alignment module employs traditional models for aligning the different frames of the image. Traditional alignment methods are preferred due to their lower computation complexity.

The main step in alignment is to find similar pixels in each frame. Using these pixels, the relationship between all frames with respect to the reference frames is calculated. Examples of structures representing the correspondences includes, but is not limited to, homography matrix, optical flow field and block matching. Each have their own pros and cons as there is a trade-off between computation complexity and precision.

Traditional and deep learning approaches have their own pros and cons. Thus, different parts of the image are handled differently so that the result would be a combination of the best of both. A first processor and a second processor integrated within the resolution enhancement system are responsible for processing the Y channel and UV channel of the image. Y channel consists of a lot of high frequency information and thus, requires better enhancement approaches to ensure the visual quality of the final image. The processing of the Y channel is split into two branches. The first branch consists of a lightweight deep learning model which is trained to super-resolve, de-noise and de-blur the given frames.

On the other hand, traditional models have more stable performance in regions with low frequency components at a relatively low computational cost. Hence, in the second branch, a mask or a weight is computed to determine regions with mainly low frequency information and local motion for traditional super resolution method to enhance. Since UV channels consist mainly of low frequency information, traditional models of low computation complexity to improve the resolution of an image could be used, such as bilateral or guided up-sampling with Y channel of high resolution as the guide or simple bi-cubic interpolation.

In order to merge and de-noise the UV channels, information regarding pixel similarity calculated during the alignment stage is utilized. Depending on the desired outcome, possible ways include to use information from Y channel only, UV channel only, or interpolation of both. In short, the final UV value of each pixel is an average of similar pixels found in the input frames.

Finally, both the high-resolution Y and UV images are concatenated to form the final output. The system takes advantage of the difference in frequency level between Y and UV channels by using a simpler processing method when enhancing the latter. For the enhancement of Y channel, there are two separate processing branches, one using traditional models and the other using deep learning model as mentioned earlier. Yet another objective of the invention is the framework of the system that allows parallel computing and thus, different hardware, such as CPU, GPU and DSP, could be utilized to accelerate the process.

Other objectives and aspects of the invention will become apparent from the following detailed description, taken in conjunction with the accompanying drawings, which illustrate, by way for example, the features in accordance with embodiments of the invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

BRIEF DESCRIPTION OF DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION

Developments in display technology have led to significant improvements in the resolution able to be displayed on display hardware, such as on televisions, on computer monitors and using video projectors. For example, television screens that are able to display "High Definition" content have been broadly adopted by consumers. More recently, television screens able to display Ultra High Definition or "Ultra HD" resolution content (typically having a resolution over 3840×2160 pixels) are starting to become more widespread.

Over time, mobile devices such as mobile phones and tablet computers with increasingly larger and higher-resolution screens are being produced and adopted by users. Further, current video content, being output at HD resolutions, is already at a significantly lower resolution than can be displayed by the latest consumer displays operating at, for example, Ultra HD resolutions. To provide sufficiently immersive virtual reality (or "VR") experiences, display technology needs to be sufficiently high resolution even for smaller screen sizes.

Figure 1A:
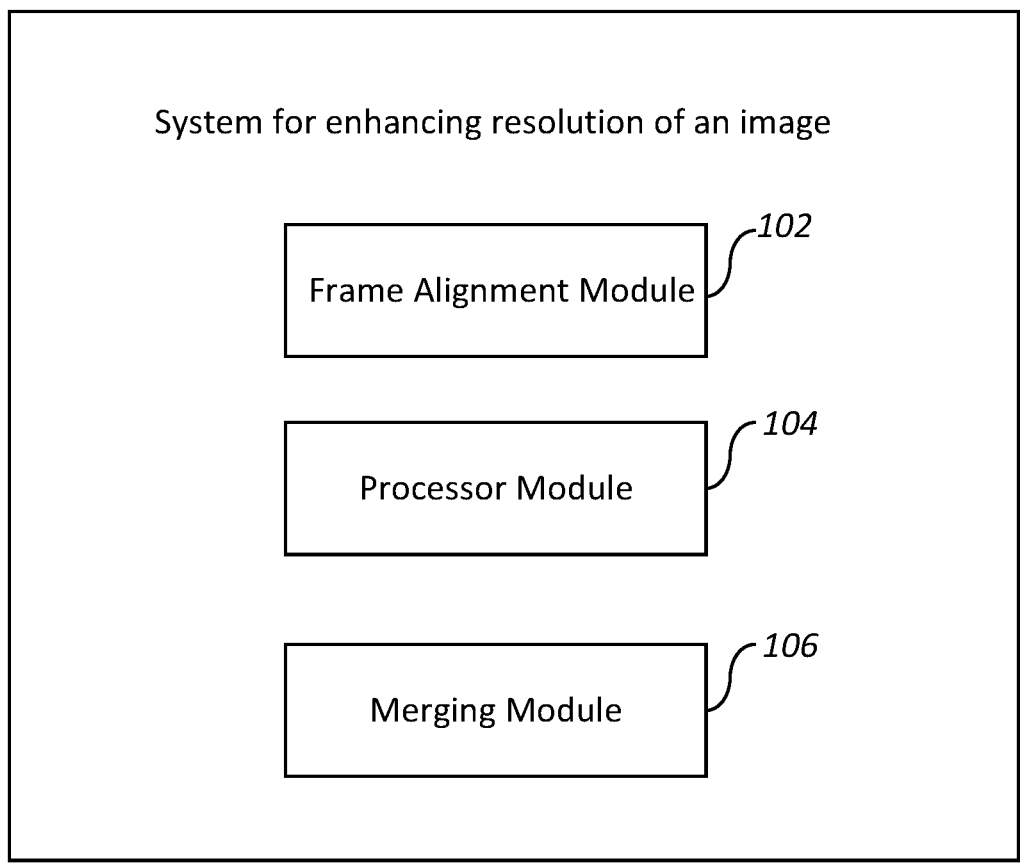
FIG. 1A illustrates a system for enhancing resolution of an image by combining a number of traditional models with deep learning models in accordance with the present invention.

FIG. 1A illustrates a system for enhancing resolution of an image by combining a number of traditional models with deep learning models. The proposed multi-frame resolution enhancement system 100 integrates traditional super resolution methods and light-weighted deep learning models such that the minimal computational time is used. Before the actual processing of the image, a number of frames of the image are aligned. It is the responsibility of the frame alignment module 102 of the system 100 to align the multiple frames of the image. Instead of considering just a single frame, multiple frames are considered for alignment by the frame alignment module 102 due to several reasons.

Under frame alignment, the main step is to find similar pixels in each frame. Using these pixels, relationship between all frames with respect to one or more reference frames is calculated. Examples of structures representing the correspondences include, but are not limited to homography matrix, optical flow field and block matching. Each has their own pros and cons as there is a trade-off between computation complexity and precision.

Homography matrix is a 3×3 matrix with 8 degree of freedom that relates the transformation between two images of the same planer surface in the space. It measures the translation, rotation and scaling between the two images in the 3D space. Optical flow field is a vector field between two images that shows how each pixel in the first image can be moved to form the second image. In other words, it finds the correspondence between pixels of the two images. Block matching represents a set of vectors which indicates the matching blocks between two images. The images are first divided into blocks and the similarity between the blocks of the two images is calculated. The resulting vector for each block shows its movement of from the first image to the second.

After the alignment of frames by the frame alignment module 102, the process of employing deep learning models along with traditional models to enhance the resolution of the image begins. A processing module 104 configured within the system 100 incorporating a first and a second processor is responsible for processing the different channels of the image. Different parts of the image are handled differently by the image processing models, i.e., deep learning models and traditional models employed by the processing module 104, so as to achieve a result with a combination of the best of both. Majorly the regions of the image with low frequency components fall under the UV channel region whereas the Y channel includes the regions with high frequency and low frequency. The merging occurs in two parts, firstly merging Y low frequency and high frequency and secondly merging Y and UV.

An exemplary approach to find such regions is to calculate the gradient of the given image. Regions with gradients below a certain threshold would represent that they are relatively flat and thus satisfy the low frequency condition and super resolution results of traditional models would be highly preferred. On the other hand, regions with gradient above a certain threshold, indicating high frequency information and strong edges, would be better handled by the deep learning model. For the in-between regions, a combination of both methods would be used.

As mentioned earlier, Y channel of the image includes a lot of high frequency information and thus, requires better enhancement approaches to ensure the visual quality of the final image. The processing of Y channel region is split into two branches. The first branch consists of a lightweight deep learning model which is trained to super-resolve, de-noise and de-blur the given frames.

On the other hand, traditional models have more stable performance in the relatively flat regions (which is low frequency also) within the Y channel at a relatively low computational cost. Hence, in the second branch, a mask is computed to determine regions with mainly low frequency information and local motion for traditional super resolution method to enhance. In general, the contribution of each pixel from each input frame is calculated based on the local gradients. This is to say that the final pixel value of the resulting image is a weighted sum of various nearby pixels from the input images.

Since UV channels consist mainly of low frequency information, traditional models of low computation complexity are used such as bilateral or guided up-sampling with Y channel of high resolution as the guide or simple bi-cubic interpolation. The choice of method depends on the actual application. The main enhancement step required is to de-noise. To merge and de-noise the UV channels, the pixel similarity information calculated during the alignment stage is utilized. The final UV value of each pixel is an average of similar pixels found in the input frames.

A merging module 106 concatenates both the high-resolution Y and UV images to form a final output which is a super-resolution image incorporating advantages of both deep learning models and traditional image resolution enhancement models. One additional optimization that could be implemented to further boost the speed is by utilizing different hardware, such as CPU, GPU and DSP, and using parallel computing. This is to take advantage of the design of the pipeline as several processing steps are independent that is they do not depend on the result of each other. For example, within enhancement of Y channel, the execution of deep learning and traditional models can also be done concurrently.

Figure 1B:
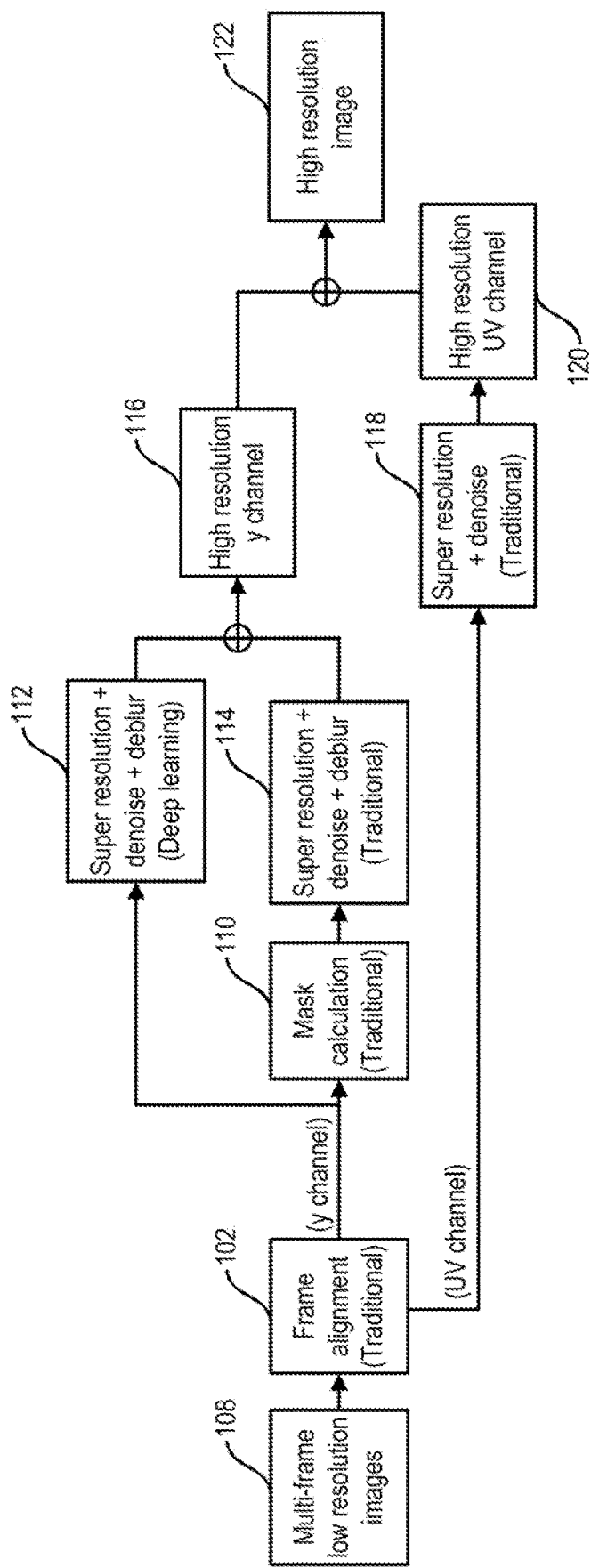
FIG. 1B illustrates a light weighted multi-frame resolution enhancement system in accordance with the present invention in accordance with the present invention.

FIG. 1B illustrates a light weighted multi-frame resolution enhancement system in accordance with the present invention. The system captures multiple frames 108 of the image and determines reference frames from among the multiple frames 108.

The frame alignment module 102 of the invention aligns the multiple frames 108 of the image. Instead of taking just a single frame, multiple frames 108 are considered for alignment by the frame alignment module due to reasons mentioned above. By fusing information from the frames 108 into the high-resolution image, more original detail from the image could be revealed that cannot be achieved when one frame alone is used.

After the alignment of frames 108 by the frame alignment module, the process of employing deep learning models along with traditional models to enhance the resolution of the image begins. A first and a second processor configured within the system are responsible for processing the different channels of the image. Different parts of the image are handled differently by the image processing models i.e. traditional and deep learning models employed by the first and the second processor.

Regions of the image with low frequency components fall under the UV channel region whereas the regions with a majority of high frequency and a few low frequency components fall under the Y channel. An exemplary approach to find such regions is to calculate the gradient of the given image. Regions with gradients below a certain threshold would represent that they are relatively flat (low frequency area) and thus, satisfy the low frequency condition and super resolution results of traditional models would be highly preferred. In general, the contribution of each pixel from each input frame is calculated based on the local gradients. On the other hand, regions with gradient above a certain threshold, indicating high frequency information and strong edges, would be better handled by the deep learning models.

Y channel is a high resolution Y channel, of the image includes a lot of high frequency information and thus, requires better enhancement approaches to ensure the visual quality of the final image declaring the training method. The processing of Y channel region is split into two branches. The first branch consists of a lightweight deep learning model 112 which is trained to super-resolve, de-noise and de-blur the given frames 108. Models such as CARN and FSRCNN are used along with some modifications made to the training approach.

On the other hand, traditional models 114 including dc-blurring and dc-noising techniques have more stable performance in regions having low frequency components at a relatively low computational cost. Hence, in the second branch, a mask 110 is computed to determine regions with mainly low frequency information and local motion for traditional super resolution method to enhance. Using both deep learning and traditional methods of resolution enhancement, high resolution Y channel output 116 is generated.

Since UV channels consist mainly of low frequency information, traditional models 118 of low computation complexity are used such as bilateral or guided up-sampling with Y channel of high resolution as the guide or simple bi-cubic interpolation. The choice of method depends on the actual application. The main enhancement step required is to de-noise. To merge and de-noise the UV channels, the pixel similarity information calculated during the alignment stage is utilized. The final UV value of each pixel is an average of similar pixels found in the input frames 108. A high resolution UV channel output 120 after processing of UV channel by traditional models.

At the end of the pipeline, both the high-resolution Y output 116 and the UV output 120 are concatenated to form the final high resolution image 122 by a merging unit. One additional optimization that could be implemented to further boost the speed is by utilizing different hardware, such as CPU, GPU and DSP, and using parallel computing. This is to take advantage of the design of the pipeline as several processing steps are independent that is they do not depend on the result of each other. For example, within enhancement of Y channel, the execution of deep learning and traditional models can also be done concurrently.

Figure 2:
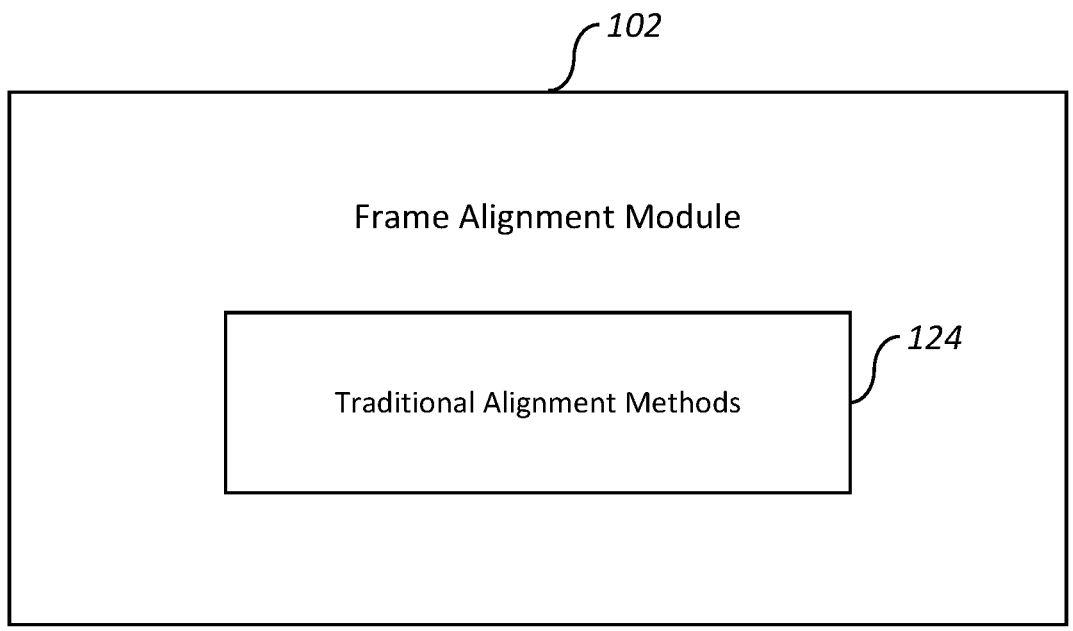
FIG. 2 illustrates a frame alignment module of the system in accordance with the present invention.

FIG. 2 illustrates a frame alignment module in accordance with the present invention. In the present invention, multiple frames of the query image are considered due to several reasons. First, when taken at different times and even slightly different positions, the combined information from all frames would be more as compared any of the single frame. Thus, by fusing information from the frames into the high-resolution image, more original detail from the image could be revealed that cannot be achieved when one frame alone is used.

Another factor to consider is computation complexity. In single image super resolution, deep learning models need to generate additional fake details because of the limited amount of information. For the detail to be realistic, the model needs to have large receptive field, which leads to more complex model. However, one drawback which arises from using multi-frame is that the frames need to be properly aligned. Without good alignment, merging would be suboptimal and hence, the quality of the final output of the pipeline will not be satisfactory regardless of the performance of the enhancement models in later steps.

Frame alignment is performed by the frame alignment module 102 before processing in order to simplify the problem, especially for the multi-frame super resolution deep learning model as it is no longer required to internally compute the flow field between frames. Traditional alignment methods 124 are preferred due to their lower computation complexity. The main step in alignment is to find similar pixels in each frame. Using these pixels, the relationship between all frames with respect to the reference frames is calculated.

In the image frame alignment process, at least one image frame needs to be selected as the reference frame for the alignment process, and other image frames and the reference frame itself are aligned to the reference frame. Examples of structures representing the correspondences include, but are not limited to, homography matrix, optical flow field and block matching. Each has their own pros and cons as there is a trade-off between computation complexity and precision.

Homography matrix is a 3×3 matrix with 8 degree of freedom that relates the transformation between two images of the same planer surface in the space. It measures the translation, rotation and scaling between the two images in the 3D space. Optical flow field is a vector field between two images that shows how each pixel in the first image can be moved to form the second image. In other words, it finds the correspondence between pixels of the two images. Block matching represents a set of vectors which indicate the matching blocks between two images. The images are first divided into blocks and the similarity between the blocks of the two images is calculated. The resulting vector for each block shows its movement from the first image to the second.

Figure 3A:
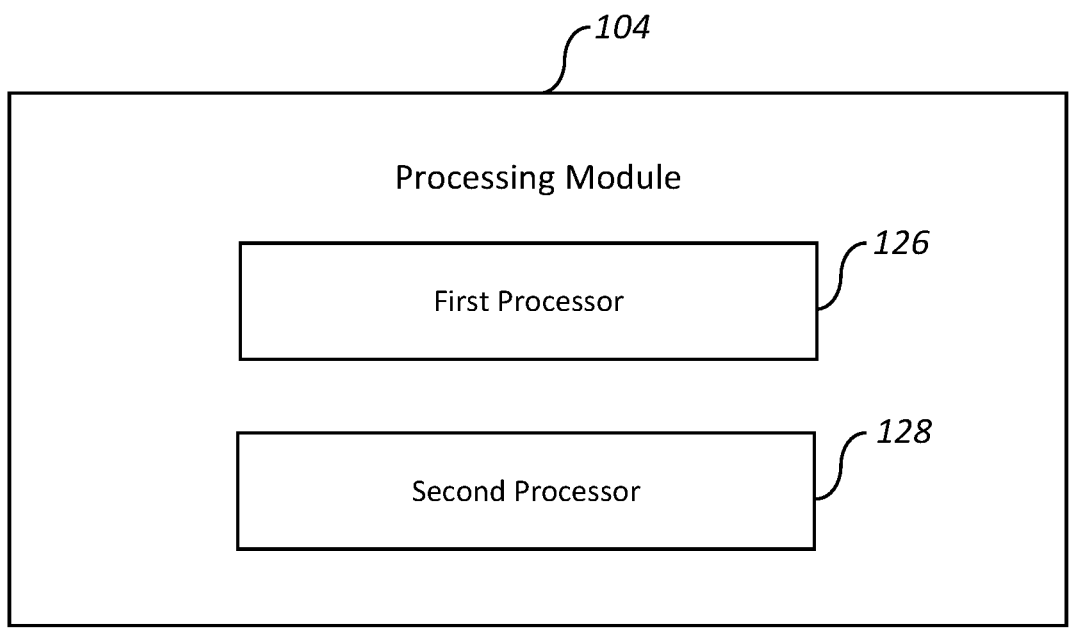
FIG. 3A illustrates a processing module of the system in accordance with the present invention.

FIG. 3A illustrates a processing module in accordance with the present invention. The processing module 104 consists of a first and a second processor for processing the different parts of the image. The Y channel of the image is processed by the first processor 126 while the processing of the UV channel of the image is done by the second processor 128. Different parts of the image are handled differently by the image processing models, i.e. traditional and deep learning models, so as to achieve a result with a combination of the best of both.

After the alignment of frames by the frame alignment module, the process of employing deep learning models along with traditional models to enhance the resolution of the image begins. The image has regions with low frequency as well as high frequency components. Regions with low frequency components fall under the UV channel region whereas the regions with high frequency components fall under the Y channel. The Y channel of an image generally includes more edge information and texture information as compared to the U and V channels of the image. For reasons that will be explained later, the efficiency of deep learning models is not great within these regions.

An example approach to find such regions is to calculate the gradient of the given image using traditional models such as Sobel or Laplacian derivatives. Regions with gradients below a certain threshold would represent that they are relatively flat and thus, satisfy the low frequency condition and super resolution results of traditional models would be highly preferred.

On the other hand, regions with gradient above a certain threshold, indicating high frequency information and strong edges, would be better handled by the deep learning model, whereas for the in-between regions, a combination of both methods would be used. The final enhanced image would be a weighted average of the super resolution outputs from both approaches with the mask being their respective weights.

Depending on the type of alignment methods used in the frame alignment step, there might be a need to find regions with local motion. Y channel consists of a lot of high frequency information and thus, requires better enhancement approaches to ensure the visual quality of the final image. The processing of Y channel region is split into two branches. The first branch consists of a lightweight deep learning model which is trained to super-resolve, de-noise and de-blur the given frames. Models such as CARN and FSRCNN are employed by the first processor 126.

On the other hand, traditional models have more stable performance in these regions at a relatively low computational cost. Hence, in the second branch, a mask is computed as described above to determine regions with mainly low frequency information and local motion for traditional super resolution method to enhance. In general, the contribution of each pixel from each input frame is calculated based on the local gradients.

UV channels of the image are then handled separately. The main reason for such differentiation in processing is because UV consists of lower frequency information as compared to Y channel. Since UV channels consist mainly of low frequency information, we could use traditional methods of low computation complexity to super resolve without significant loss in performance, such as bilateral or guided up-sampling with Y channel of high resolution as the guide or simple bi-cubic interpolation. The choice of method depends on the actual application. The main enhancement step required is to de-noise.

Figure 3B:
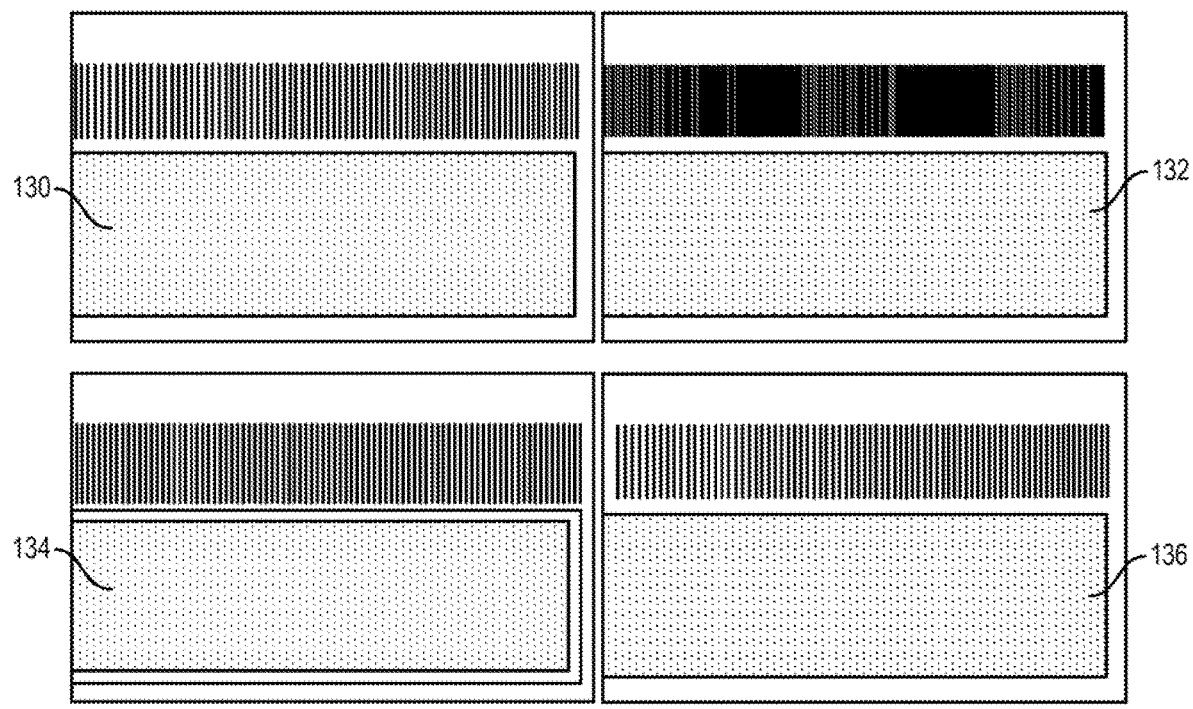
FIG. 3B illustrates merging operation of outputs from the traditional model and deep learning model in Y channel in accordance with the present invention.

FIG. 3B illustrates merging of traditional and deep learning results in Y channel. As per mentioned earlier, Y channel consists of a lot of high frequency information and thus, requires better enhancement approaches to ensure the visual quality of the final image. In this part, we further split the processing steps into two branches. The first branch consists of a lightweight deep learning model which is trained to super-resolve, de-noise and de-blur the given frames. Deep learning models such as CARN and FSRCNN are used.

In order to conform to the actual use case, changes are made to the data preparation such that it includes real noise patterns. Furthermore, additional loss functions are introduced during the model training for detail enhancements. However, considering the restriction in computation complexity, there is a limit to the model performance. More specifically, when the losses are designed such that details are emphasized, its de-noising capability would be affected.

This is undesirable especially for flat regions. As shown in the top left image 130 in FIG. 3B, the model performs well in regions with high frequency and strong edges. However, in relatively flat regions as observed in the lower part of the image, unwanted artefacts can be seen in patches because when the model attempts to enhance the weaker edges, it also amplifies the noise.

On the other hand, traditional models have more stable performance in these regions at a relatively low computational cost. Hence, in the second branch, a mask is computed to determine regions with mainly low frequency information and local motion for traditional super resolution method to enhance. The top-right image 132 of FIG. 3b illustrates the results using traditional models. The contribution of each pixel from each input frame is calculated based on the local gradients. This is to say that the final pixel value of the resulting image is a weighted sum of various nearby pixels from the input images.

In the bottom left image 134 of FIG. 3B, the brighter regions indicate regions with stronger edges or higher frequency information. The bottom right image of FIG. 3b illustrates the result 136 obtained by merging both deep learning models and traditional models of enhancing the resolution of the Y channel section of the image.

Figure 4A:
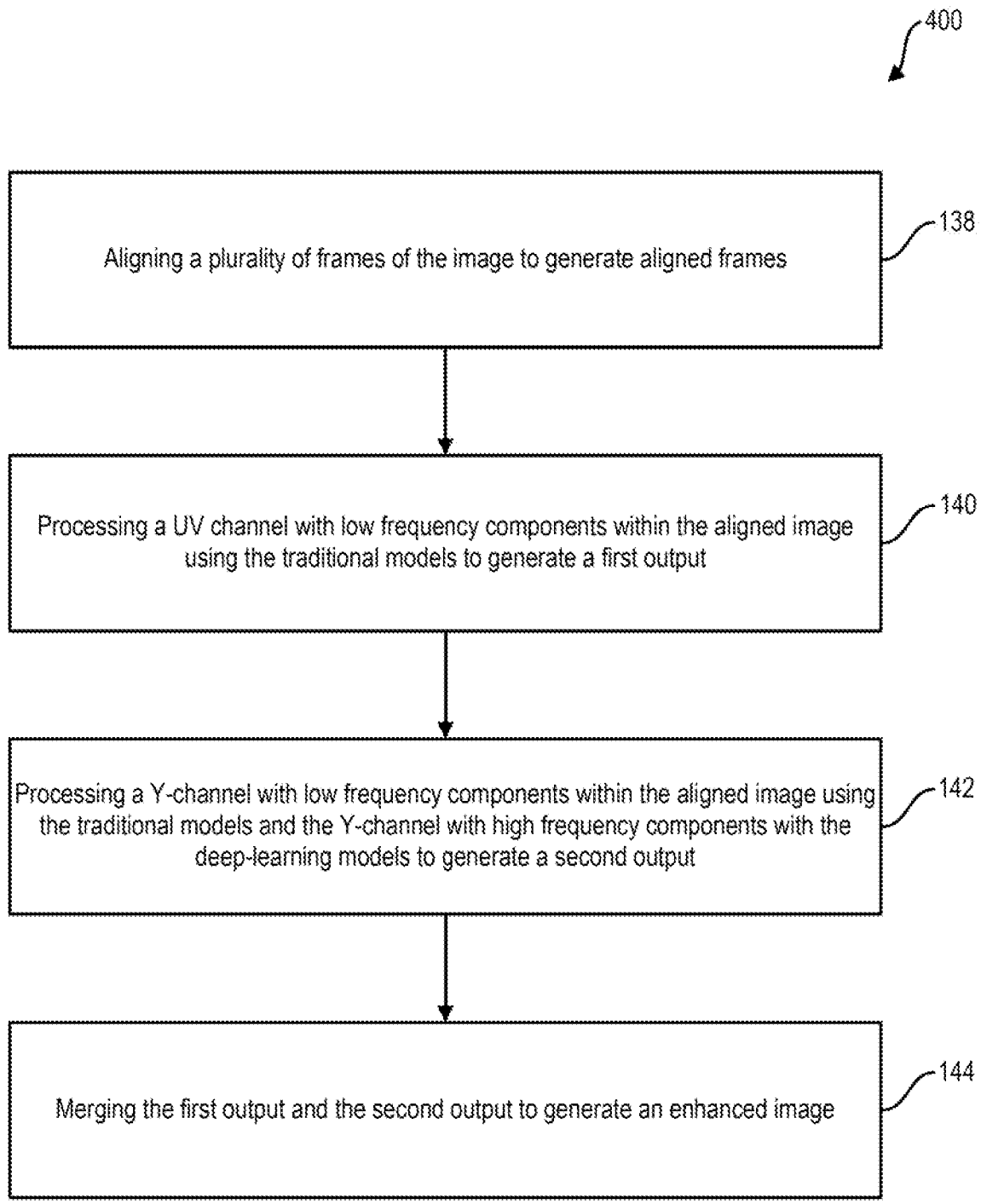
FIG. 4A illustrates a method for enhancing resolution of the image in accordance with the present invention.

FIG. 4A illustrates a flowchart depicting a method enhancing resolution of an image by combining traditional models and deep learning models. The flowchart illustrates a method including aligning a plurality of frames of the image to generate aligned frames, wherein the frame alignment module further identifies similar pixels in the aligned frames with respect to reference frames to generate an aligned image in step 138. In step 140, after the alignment of frames by the frame alignment unit, the first processor of the processing module processes UV channel of the image with low frequency components within the aligned image using the traditional models of resolution enhancement to generate a first output.

The processing of the Y channel of the image with low frequency components within the aligned image using the traditional resolution enhancement models and the Y-channel with high frequency components with the deep-learning models to generate a second output in step 142. Finally, the merging module merges the first output and the second output to generate an enhanced image in step 144.

Figure 4B:
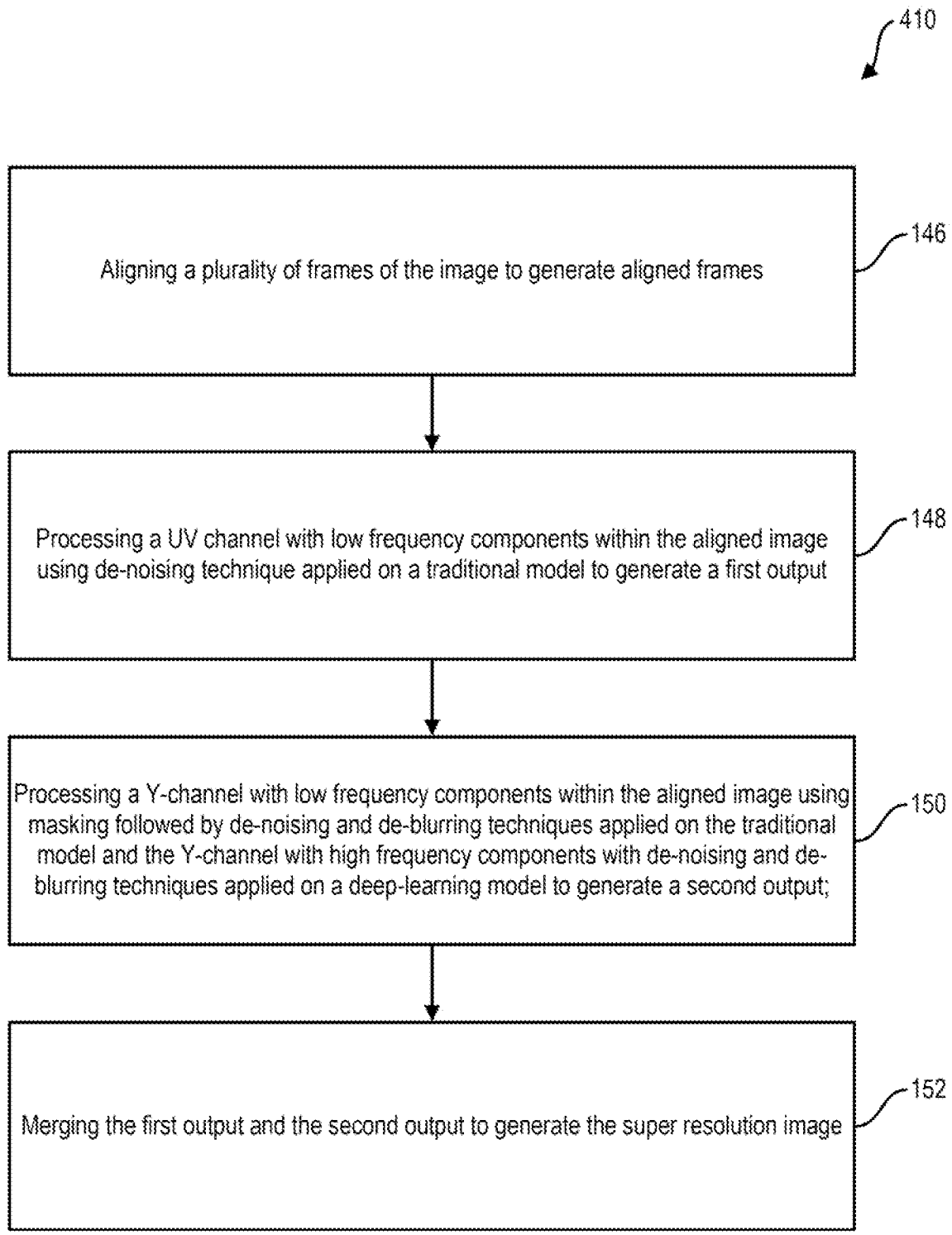
FIG. 4B illustrates another method for generating a light-weighted multi-frame super resolution image in accordance with the present invention.

FIG. 4B illustrates a flowchart depicting a method for generating light-weighted multiframe super resolution image. The flowchart illustrates a method involving aligning a plurality of frames of the image to generate aligned frames, wherein the frame alignment module further identifies similar pixels in the aligned frames with respect to reference frames to generate an aligned image in step 146. In step 148, once the multiple frames of the image are aligned, the first processor processes the UV channel with low frequency components within the aligned image using denoising technique of traditional image enhancement methods to form a first output.

After processing the UV channel, the second processor of the processing module processes a Y channel of the image with low frequency components within the aligned image using masking which is followed by de-noising and deblurring techniques of the traditional resolution enhancement models. Also, the high frequency components are handled by the deep learning models. The results achieved from the traditional and deep learning models in the Y channel are combined to generate a second output in step 150. Finally, the merging unit merges the first output and the second output to generate the super resolution image in step 152.

While the various embodiments of the present invention have been described above, it should be understood that they have been presented by way of example only, and not of limitation. Likewise, the figure may depict an example architectural or other configuration for the invention, which is done to aid in understanding the features and functionality that can be included in the invention. The invention is not restricted to the illustrated example architectures or configurations, but the desired features can be implemented using a variety of alternative architecture and configurations.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

The invention claimed is:

1. A system comprising one or more computers having at least a first processor and a second processor and one or more computer useable media, the system configured to enhance a resolution of an image by combining deep learning models and non-deep learning models, wherein the system comprises computer program logic to:
  align a plurality of frames of the image to generate aligned frames, wherein the aligning further comprises identifying similar pixels in the aligned frames with respect to reference frames to generate an aligned image;
  separately process a Y-channel and a UV-channel of the aligned image, the Y-channel of the aligned image comprising high frequency components and low frequency components within the aligned image and the UV-channel of the aligned image comprising low frequency components within the aligned image, the separate processing comprising:
    processing, using the first processor, the Y-channel of the aligned image, the processing comprising: a) applying one or more deep learning models to the high frequency components and the low frequency components of the Y-channel to generate a first high resolution output, b) applying one or more first non-deep learning models to the low frequency components of the Y-channel to generate a second high resolution output, and c) combining the first high resolution output and the second high resolution output to generate a Y-channel output comprising a high resolution enhanced Y-channel image; and
    processing, using the second processor, the UV-channel within the aligned image using one or more second non-deep learning models to generate a UV-channel output comprising a high resolution enhanced UV-channel image; and
  merge the Y-channel output and the UV-channel output to generate a final enhanced image.

2. The system of claim 1, wherein identifying similar pixels is based on one or more of a Homography matrix, optical flow field, or block matching.

3. The system of claim 1, wherein the low frequency components and the high frequency components of the image are based on a gradient value of one or more regions within the image.

4. The system of claim 3, wherein the gradient value is calculated using either Sobel derivatives or Laplacian derivatives.

5. The system of claim 4, wherein the gradient value of each of the low frequency components is less than a threshold gradient value.

6. The system of claim 4, wherein the gradient value of each of the high frequency components is more than a threshold gradient value.

7. The system of claim 1, wherein the processing of each of the low frequency components and the high frequency components within the Y-channel is performed concurrently.

8. The system of claim 1, wherein the non-deep learning models are based on guided up-sampling or bi-cubic interpolation.

9. A system comprising one or more computers having at least a first processor and a second processor and one or more computer useable media, the system configured to generate light-weighted multi-frame super resolution images, wherein the system comprises computer program logic to:
  align a plurality of frames of the image to generate aligned frames, wherein the aligning further comprises identifying similar pixels in the aligned frames with respect to reference frames to generate an aligned image;
  separately process a Y-channel and a UV-channel of the aligned image, the Y-channel comprising high frequency components and low frequency components within the aligned image and the UV-channel comprising low frequency components within the aligned image, the separate processing comprising:
    processing, using the first processor, the Y-channel of the aligned image, the processing comprising: a) applying one or more deep learning models to the high frequency components and the low frequency components of the Y-channel to generate a first de-noised and de-blurred output, b) using masking to determine the low frequency components of the Y-channel followed by applying one or more first non-deep learning models to the low frequency components of the Y-channel to generate a second de-noised and de-blurred output, and c) combining the first de-noised and de-blurred output with the second de-noised and de-blurred output to generate a Y-channel output comprising a super-resolution Y-channel image; and
    processing, using the second processor, the UV-channel within the aligned image using one or more second non-deep learning models to generate UV-channel output comprising a super-resolution UV-channel image; and
  merge the Y-channel output and the UV-channel output to generate a final super resolution image.

10. A method for enhancing resolution of an image by combining deep learning models and non-deep learning models, wherein the method comprising:
  aligning a plurality of frames of the image to generate aligned frames, wherein the aligning further identifies similar pixels in the aligned frames with respect to reference frames to generate an aligned image;
  separately processing a Y-channel and a UV-channel of the aligned image, the Y-channel of the aligned image comprising high frequency components and low frequency components within the aligned image and the UV-channel of the aligned image comprising low frequency components within the aligned image, the separate processing comprising:
    processing the Y-channel of the aligned image, the processing comprising: a) applying one or more deep learning models to the high frequency components and the low frequency components of the Y-channel to generate a first high resolution output, b) applying one or more first non-deep learning models to the low frequency components of the Y-channel to generate a second high resolution output, and c) combining the first high resolution output and the second high resolution output to generate a Y-channel output comprising a high resolution enhanced Y-channel image;
    processing the UV-channel within the aligned image using one or more second non-deep learning models to generate a UV-channel output comprising a high resolution enhanced UV-channel image; and
  merging the Y-channel output and the UV-channel output to generate a final enhanced image.

11. The method of claim 10, wherein identifying similar pixels is based on one or more of a Homography matrix, optical flow field, or block matching.

12. The method of claim 10, wherein the low frequency components and the high frequency components of the image are based on a gradient value of one or more regions within the image.

13. The method of claim 12, wherein the gradient value is calculated using either Sobel derivatives or Laplacian derivatives.

14. The method of claim 13, wherein the gradient value of each of the low frequency components is less than a threshold gradient value.

15. The method of claim 13, wherein the gradient value of each of the high frequency components is more than a threshold gradient value.

16. The method of claim 10, wherein the processing of each of the low frequency components and the high frequency components within the Y-channel is performed concurrently.

17. The method of claim 10, wherein the non-deep learning models are based on guided up-sampling or bi-cubic interpolation.

18. A method for generating light-weighted multi-frame super resolution images, wherein the method comprising:
aligning a plurality of frames of the image to generate aligned frames, wherein the aligning further identifies similar pixels in the aligned frames with respect to reference frames to generate an aligned image;
separately process a Y-channel and a UV-channel of the aligned image, the Y-channel comprising high frequency components and low frequency components within the aligned image and the UV-channel comprising low frequency components within the aligned image, the separate processing comprising:
processing the Y-channel of the aligned image, the processing comprising: a) applying one or more deep learning models to the high frequency components and the low frequency components of the Y-channel to generate a first de-noised and de-blurred output, b) using masking to determine the low frequency components of the Y-channel followed by applying one or more first non-deep learning models to the low frequency components of the Y-channel to generate a second de-noised and de-blurred output, and c) combining the first de-noised and de-blurred output with the second de-noised and de-blurred output to generate a Y-channel output comprising a super-resolution Y-channel image;
processing the UV-channel within the aligned image using one or more second non-deep learning models to generate a de-noised UV-channel output comprising a super-resolution UV-channel image; and
merging the Y-channel output and the UV channel output to generate a final super resolution image.

19. A computer program product comprising a non-transitory computer useable medium having computer program logic for enabling at least one processor in a computer system for enhancing resolution of an image by combining deep learning models and non-deep learning models, the computer program logic comprising:
aligning a plurality of frames of the image to generate aligned frames, wherein the aligning further identifies similar pixels in the aligned frames with respect to reference frames to generate an aligned image;
separately processing a Y-channel and a UV-channel of the aligned image, the Y-channel of the aligned image comprising high frequency components and low frequency components within the aligned image and the UV-channel of the aligned image comprising low frequency components within the aligned image, the separate processing comprising:
processing the Y-channel of the aligned image, the processing comprising: a) applying one or more deep learning models to the high frequency components and the low frequency components of the Y-channel to generate a first high resolution output, b) applying one or more first non-deep learning models to the low frequency components of the Y-channel to generate a second high resolution output, and c) combining the first high resolution output and the second high resolution output to generate a Y-channel output comprising a high resolution enhanced Y-channel image;
processing the UV-channel within the aligned image using one or more second non-deep learning models to generate a UV-channel output comprising a high resolution enhanced UV-channel image; and
merging the Y-channel output and the UV-channel output to generate a final enhanced image.

20. A computer program product comprising a non-transitory computer useable medium having computer program logic for enabling at least one processor in a computer system for generating light-weighted multi-frame super resolution images, said computer program logic comprising:
aligning a plurality of frames of the image to generate aligned frames, wherein the aligning further identifies similar pixels in the aligned frames with respect to reference frames to generate an aligned image;
separately process a Y-channel and a UV-channel of the aligned image, the Y-channel comprising high frequency components and low frequency components within the aligned image and the UV-channel comprising low frequency components within the aligned image, the separate processing comprising:
processing the Y-channel of the aligned image, the processing comprising: a) applying one or more deep learning models to the high frequency components and the low frequency components of the Y-channel to generate a first de-noised and de-blurred output, b) using masking to determine the low frequency components of the Y-channel followed by applying one or more first non-deep learning models to the low frequency components of the Y-channel to generate a second de-noised and de-blurred output, and c) combining the first de-noised and de-blurred output with the second de-noised and de-blurred output to generate a Y-channel output comprising a super-resolution Y-channel image;
processing the UV-channel within the aligned image using one or more second non-deep learning models to generate a de-noised UV-channel output comprising a super-resolution UV-channel image; and
merging the Y-channel output and the UV-channel output to generate a final super resolution image.

* * * * *